(12) United States Patent
Kuoch et al.

(10) Patent No.: US 11,745,658 B2
(45) Date of Patent: Sep. 5, 2023

(54) METHOD FOR PROVIDING VISUAL INFORMATION ABOUT AT LEAST PART OF AN ENVIRONMENT, COMPUTER PROGRAM PRODUCT, MOBILE COMMUNICATION DEVICE AND COMMUNICATION SYSTEM

(71) Applicant: Valeo Schalter und Sensoren GmbH, Bietigheim-Bissingen (DE)

(72) Inventors: Siav-Kuong Kuoch, Bobigny (FR); Patrice Reilhac, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 17/292,848

(22) PCT Filed: Nov. 11, 2019

(86) PCT No.: PCT/EP2019/080814
§ 371 (c)(1),
(2) Date: May 11, 2021

(87) PCT Pub. No.: WO2020/099295
PCT Pub. Date: May 22, 2020

(65) Prior Publication Data
US 2021/0394676 A1  Dec. 23, 2021

(30) Foreign Application Priority Data

Nov. 15, 2018  (DE) .............. 10 2018 128 634.1

(51) Int. Cl.
*B60R 1/00*  (2022.01)
*G06V 20/58*  (2022.01)
(Continued)

(52) U.S. Cl.
CPC ............. *B60R 1/00* (2013.01); *G06V 20/58* (2022.01); *G06V 40/103* (2022.01); *H04L 67/12* (2013.01);
(Continued)

(58) Field of Classification Search
CPC . B60R 1/00; B60R 2300/50; B60R 2300/202; B60R 2300/205;
(Continued)

(56) References Cited

U.S. PATENT DOCUMENTS

2006/0207818 A1* 9/2006 Fujioka ................ B60T 17/221
180/167
2007/0115138 A1* 5/2007 Arakawa ................ B60R 1/00
340/901
(Continued)

FOREIGN PATENT DOCUMENTS

CN     112930555 A     6/2021
DE     10247563 A1     4/2004
(Continued)

OTHER PUBLICATIONS

Rameau et al. "A Real-Time Augmented Reality System to See-Through Cars" IEEE Transactions on visualization and computer graphics vol. 22 No. 11 Nov. 2016, 10 pages.*
(Continued)

*Primary Examiner* — Nathnael Aynalem
(74) *Attorney, Agent, or Firm* — Osha Bergman Watanabe & Burton LLP

(57) ABSTRACT

A method for providing visual information about at least part of an environment on a display device is disclosed. The method involves detecting a first vehicle travelling ahead by a sensor device, requesting and receiving the visual information about the environment, a view onto which is concealed partly by the first vehicle, capturing an image of a
(Continued)

Figure 1:
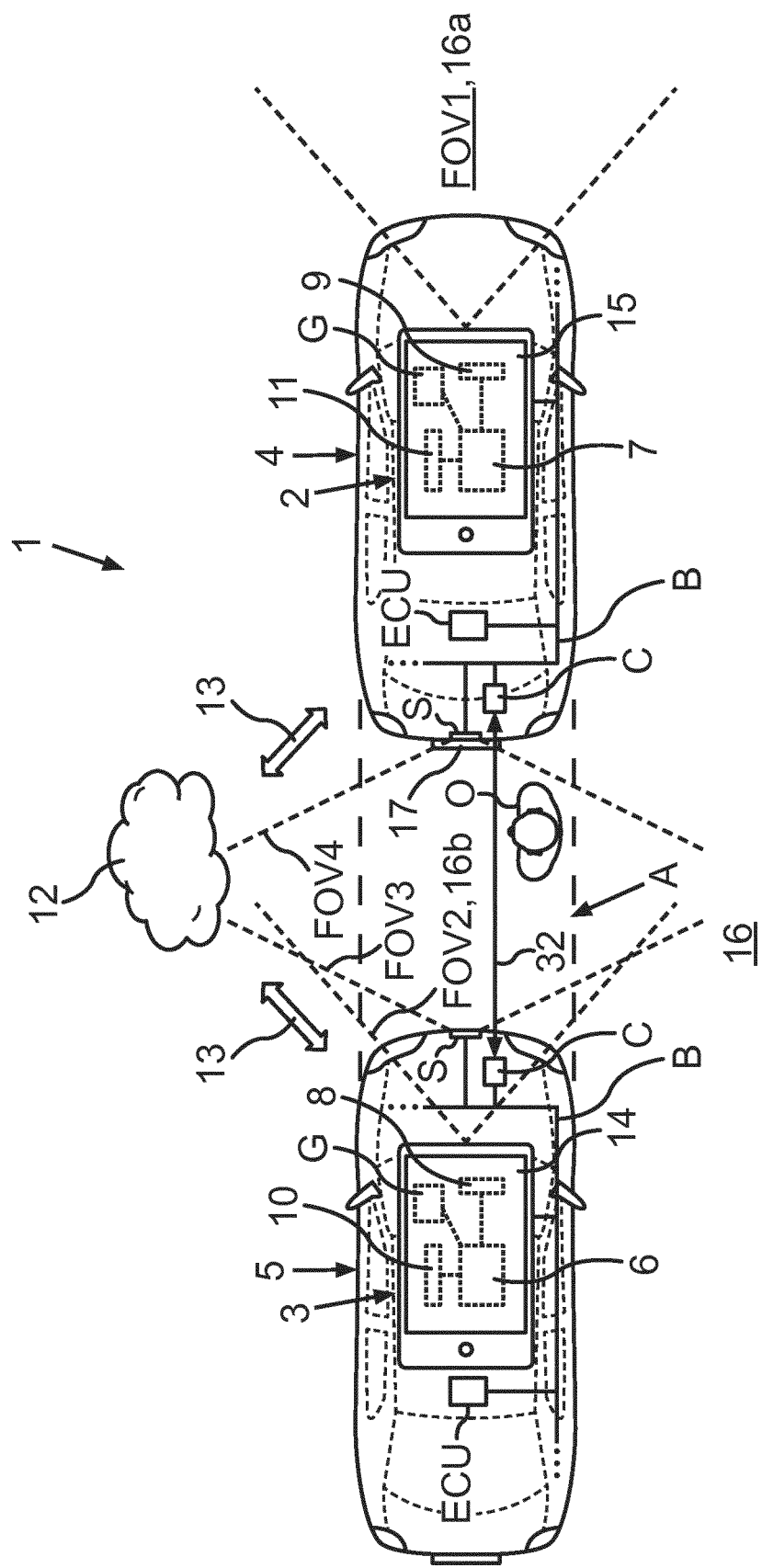

certain part of the environment including at least part of the first vehicle, and displaying the image of the certain part of the environment and the received visual information as a video stream embedded in the image on the display device. When it is determined that an object different from the first vehicle is present in the certain part of the environment and that the object cannot be driven over, the displaying of the visual information is modified so that the at least one object is clearly visible for a driver.

12 Claims, 5 Drawing Sheets

(51) Int. Cl.
 *G06V 40/10* (2022.01)
 *H04L 67/12* (2022.01)
 *H04N 5/265* (2006.01)

(52) U.S. Cl.
 CPC .......... *H04N 5/265* (2013.01); *B60R 2300/10* (2013.01); *B60R 2300/20* (2013.01); *B60R 2300/80* (2013.01); *G06V 2201/08* (2022.01)

(58) Field of Classification Search
 CPC ........ B60R 2300/207; B60R 2300/301; B60R 2300/303; B60R 2300/304; B60R 2300/305; B60R 2300/60; B60R 2300/70; B60R 2300/10; B60R 21/00; B60R 2300/8033; B60R 2300/8093; G06K 9/00791; G06K 9/00798; G06K 9/00805; G06K 9/00342; G06K 9/00362; G06K 9/00369; G06K 2209/23; G06T 2207/20221; G06T 2207/20212; G06T 2207/30252; G06T 2210/62; G06T 7/337; G08G 1/167; G08G 1/166; G08G 1/165; G08G 1/164

USPC .......................................................... 348/148
See application file for complete search history.

(56) References Cited

U.S. PATENT DOCUMENTS

| | | | |
|---|---|---|---|
| 2009/0231431 | A1 | 9/2009 | Grigsby et al. |
| 2014/0341434 | A1* | 11/2014 | Lin ........................... B60R 1/00 382/104 |
| 2015/0145995 | A1 | 5/2015 | Shahraray et al. |
| 2016/0277601 | A1* | 9/2016 | Seymour ................... G08G 1/04 |
| 2016/0339959 | A1* | 11/2016 | Lee ..................... G06K 9/00798 |
| 2016/0379411 | A1 | 12/2016 | Harbach et al. |
| 2017/0187963 | A1* | 6/2017 | Lee ..................... H04N 5/23218 |
| 2017/0355306 | A1 | 12/2017 | Bellotti et al. |
| 2018/0032078 | A1* | 2/2018 | Ferguson ............... G06V 20/58 |
| 2018/0101736 | A1 | 4/2018 | Han et al. |
| 2020/0074735 | A1* | 3/2020 | Nowakowski .......... G06T 11/60 |
| 2020/0086789 | A1* | 3/2020 | Nowakowski ........ G06T 15/503 |

FOREIGN PATENT DOCUMENTS

| | | |
|---|---|---|
| DE | 102008034606 A1 | 1/2010 |
| DE | 102009045748 A1 | 4/2011 |
| DE | 202014102291 U1 | 8/2014 |
| DE | 102015007491 A1 | 12/2016 |
| DE | 102018105951 A1 | 9/2018 |

OTHER PUBLICATIONS

International Search Report and Written Opinion in corresponding International Application No. PCT/EP2019/080814, dated Jan. 27, 2020 (10 pages).

German Search Report in corresponding German Application No. 10 2018 128 634.1, dated Jun. 6, 2019 (9 pages).

First Office Action in corresponding Chinese Application No. 201980085407.X, dated Apr. 18, 2023 (30 pages).

* cited by examiner

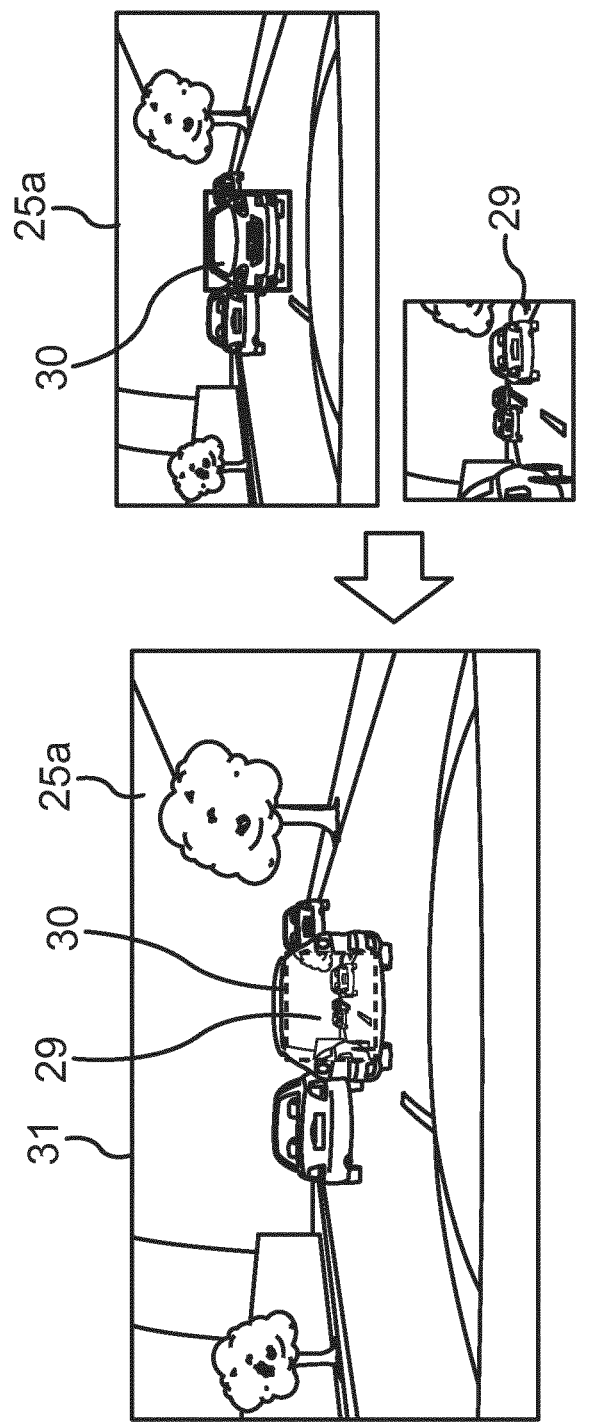

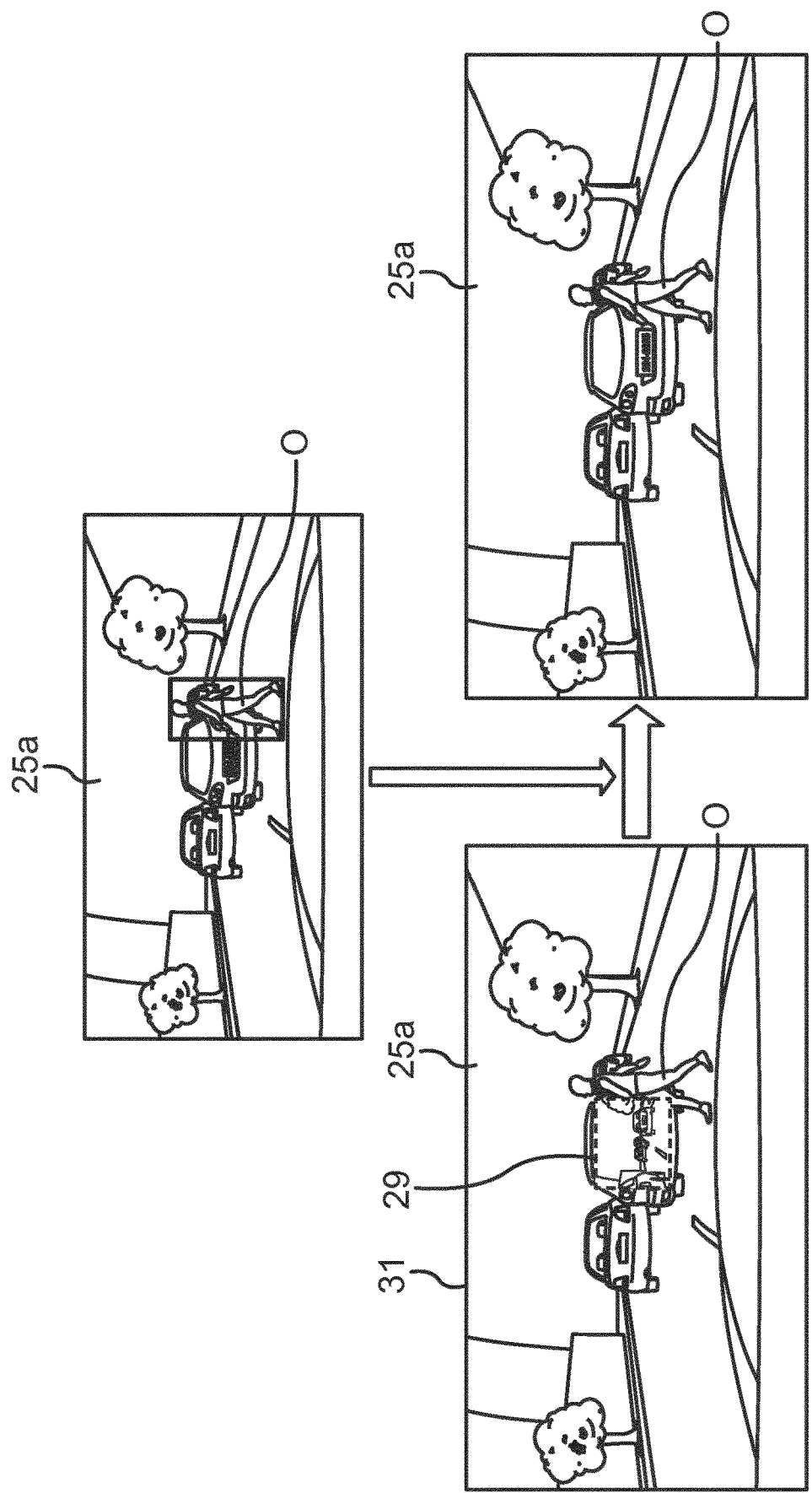

METHOD FOR PROVIDING VISUAL INFORMATION ABOUT AT LEAST PART OF AN ENVIRONMENT, COMPUTER PROGRAM PRODUCT, MOBILE COMMUNICATION DEVICE AND COMMUNICATION SYSTEM

The invention relates to a method for providing visual information about at least part of an environment, the view onto which is at least in part concealed by a vehicle travelling ahead, on a display device, wherein the vehicle is detected by means of at least one sensor device and the visual information about the at least part of the environment, the view onto which is at least in part concealed by the vehicle, is requested by means of a communication unit. In case of an availability of the requested visual information, the visual information is received by the communication unit. Moreover, at least one image of the environment including at least part of the vehicle is captured and the at least one image of the environment and the received visual information embedded in the at least one image is displayed on the display device. The invention also relates to a computer program product, a mobile communication device and a communication system.

Systems for providing so called see-through functions in vehicles are known from the prior art. For example US 2014/0341434 A1 describes a dynamic fusion method of images, whereby the broadcast information is received from surrounding vehicles of a host vehicle. It is determined whether at least one of the surrounding vehicles travels in the same lane as the host vehicle, which is then defined as neighbouring vehicle of the host vehicle according to the broadcast information. Moreover it is determined whether the neighbouring vehicle is too close to the host vehicle and blocks the view of the host vehicle. Then a transparentization or translucentization process is performed on the neighbouring vehicle in an image captured by the host vehicle when the neighbouring vehicle blocks the view of the host vehicle. Thereby the broadcast information may include both image and position information of the surrounding vehicles.

By means of such see-through functions the safety can be enhanced, as a driver can be provided with much more environment information and can even see parts of the environment, which from his perspective or the perspective of the camera associated with his vehicle are concealed by vehicles travelling ahead. Thereby for example overtaking maneuvers can be performed much more safely.

It is an object of the present invention to provide a method for providing visual information about at least part of an environment, the view onto which is at least in part concealed by a first vehicle travelling ahead, a computer program product, a mobile communication device and a communication system, which allow for see-through functions, which can enhance the safety even more.

This object is solved by a method, by a computer program product, by a mobile communication device and by a communication system with the features according to the respective independent claims. Advantageous embodiments of the invention are presented in the depended claims, the description and the drawings.

According to the invention a method for providing visual information about at least part of an environment, the view onto which is at least in part concealed by a first vehicle travelling ahead, on a display device is provided, wherein the first vehicle is detected by means of at least one sensor device, like a camera, and the visual information about the at least part of the environment, the view onto which is at least in part concealed by the first vehicle, is requested by means of a communication unit. In case of an availability of the requested visual information the visual information is received by the communication unit. Moreover, at least one image of the environment including at least part of the first vehicle is captured and the at least one image of the environment and the received visual information embedded in the at least one image are displayed on the display device. Furthermore, in case it is determined, that at least one object different from the first vehicle is present in the certain part of the environment, the displaying of the visual information is modified such that image parts representing the at least one object are not covered by the visual information.

The invention is based on the idea, that though see-trough functions in most situations enhance safety, however, in case the see-through application, especially the received visual information, which is embedded in the at least one image of the captured environment, can hide objects, like pedestrians crossing the street, which need to be noticed by the driver, and which therefore may be very dangerous if not. The invention now advantageously manages to eliminate the risk of hiding such important objects by modifying the displaying of the visual information when it is determined, that at least one object is present in the certain part of the environment. Especially, the displaying of the visual information is modified such, that image parts representing the at least one object are not covered by the visual information. Thereby, the safety can be enhanced enormously, as a driver can then clearly see such object on the display device.

Generally, the method described above can be performed by a second vehicle following the first vehicle and the at least one sensor device, the communication unit and the display device can constitute components of the second vehicle. However, it is preferred that the method described above is performed by a mobile communication device, which has a variety of great advantages, which however are described later on.

Further, the modification of the displaying of the visual information in case of a detection of the at least one object can be performed in several advantageous ways.

For example it would be possible that the displaying of the visual information is modified by increasing a degree of transparency, according to which the visual information is displayed as an overlay over the at least one image of the environment. Therefore parts of the at least one image behind that overlay image are visible, and also such a detected object, in case it would be behind that overlay, can therefore be seen then.

However, to make sure, that there is no risk at all that the visual information occludes an object that needs to be noticed by the driver, it is according to an advantageous embodiment of the invention preferred that in case it is determined, that the at least one object different from the first vehicle is present in the certain part of the environment, the displaying of the visual information is modified by interrupting the displaying of the visual information. Thereby, only the displaying of the received visual information can be interrupted or also the receiving of the visual information. In other words, as soon as a certain object is detected in a certain area of the environment, the displaying of the additional visual information is stopped and only the at least one image of the environment, which preferably is provided in form of a continuous video stream of the environment, is kept displaying. This means, the see-through function is turned off.

This, advantageously, is the most reliable way to ensure that the additional visual information cannot hide the detected object in the at least one image of the environment. Further, as soon as it is determined that the object is not detected anymore, the visual information, or rather newly received visual information can be displayed embedded in the images of the environment again.

Moreover, in case the at least one object is detected, this object can additionally be highlighted in the displayed at least one image of the environment. Thereby a specific processing of the at least one image of the environment can be performed to highlight the detected object. For example the regions of the object in the at least one image of the environment can be marked in color, their brightness can be increased, they can be displayed blinking or be highlighted otherwise. Thereby the presence of the detected object can be noticed to the driver even more significantly. Therefore, when the displaying of the visual information is stopped and the detected object is additionally highlighted, the safety can be enhanced even more.

According to another advantageous embodiment of the invention, the displaying of the visual information is only modified at least under the first condition that the at least one object is classified as being associated with a person. Thereby, the object can for example be classified as a person as such, for example as a pedestrian, or also as another road user, like another vehicle or motorcycle or a bicycle, and so on.

This is particularly advantageous, as in case the object is associated with a person the recognition of such object by the driver of the second vehicle is especially important, as in case a pedestrian or other road user is overlooked by the driver, very critical and dangerous situations can occur.

Moreover, as also critical situations can occur in case an animal gets in the way of the second vehicle and is overlooked by the driver. Therefore it's another advantageous embodiment of the invention, that the displaying of the visual information is only modified at least under the alternative second condition that the at least one object is classified as an animal, like a dog or a cat or a deer.

Generally, detected objects can be classified into two classes like a class for critical objects and a class for uncritical objects and in case the detected object is classified as being a critical object, like being associated with a person, the displaying of the visual information is modified, and otherwise not. Uncritical objects may be for example a plastic bag on the road. As no danger would result from such uncritical objects on the road, the visual information can advantageously be kept displayed unmodified.

In the alternative, a modification of the displaying of the visual information can be performed for any object detected in the certain part of the environment and no classification has to be performed as described above. Thereby it can advantageously be ensured that no object, no matter which kind of object or obstacle, is hidden by the visual information.

Besides, as already mentioned above, it is preferred that at least most of the described method steps are performed by a mobile communication device. Also the detection and classification of objects can be performed by such a mobile communication device, but also vehicle components, like object detection and classification systems of vehicles, can be used for this purpose, which is explained later in more detail. In the following, first the implementation on the see-through function is explained in more detail now.

Preferably, the visual information is provided in form of at least part of a first video stream captured by a first device, which is associated with the first vehicle, especially a first mobile communication device within the first vehicle. For capturing the visual information advantageously, a first device different from the first vehicle, especially a first mobile communication device, like a smartphone, can be used. For that purpose, the first device can be placed somewhere behind the windshield of the first vehicle. Preferably, the first device is positioned such behind the windshield of the first vehicle that the field of view of a sensor device of the first device, preferably a camera of the first device, covers at least part of the environment in front of the first vehicle. Moreover, at least one or several or each of the images of the first video stream can be displayed on the display device each as a whole or only a certain image region of at least one or several or each of the captured images of the first video can be streamed and/or displayed. For example only a central region of the images can be streamed and displayed on the display device. Moreover, it is also possible that the content of the received images or image regions of the first video stream is analyzed with regard to the image content of temporally corresponding images of a second video stream as described later, and only that part of the images of the first video stream is displayed, which is concealed by the first vehicle from the perspective of the at least one sensor device.

Moreover, according to another advantageous embodiment of the invention, the at least one sensor device and/or the communication unit and/or the display device are provided as part of a second mobile communication device, especially a smartphone associated with a second vehicle trailing the first vehicle. Moreover, this second mobile communication device preferably comprises a processing unit, which is capable of controlling the at least one sensor device, which here again is preferably configured as a camera, the communication unit as well as the display device in such a manner, that the second mobile communication device is configured to perform a method as described before. Moreover, also the second mobile communication device may be configured such that also the capabilities as described which regard to the first device can be provided by the second mobile communication device as well. In other words, also the second mobile communication device can be positioned behind the windscreen of the second vehicle such that the field of view of the camera of the second mobile communication device covers at least a part of the environment in front of the second vehicle. The images captured by the camera of the second mobile communication device can on the one hand be used to detect the first vehicle traveling ahead and on the other hand, the images captured by the camera of the second mobile communication device can, if requested, be provided to other vehicles, especially to their associated mobile communication devices, in form of visual information to provide see-through functionalities for those other, e.g. trailing vehicles, as well.

Advantageously, the necessary components, especially except for a central data processing unit as explained later, used to provide these see-through functionalities can be provided in a cost effective way by the mobile communication device and an application running on the mobile communication device for executing the method according to the invention or its embodiments. Consequently vehicles do not have to be equipped with any kind of sensors, positioning systems or other components to provide see-through functionalities, but those see-through functionalities can be provided simply by a mobile communication device, especially by a corresponding application program running on that mobile communication device. This way any arbitrary vehicle can be provided with see-through functionalities without needing any special components.

Moreover, it is preferred, that the at least one image of the environment including at least part of the first vehicle is provided in form of a second video stream by means of the at least one sensor device. In other words, preferably the at least one image of the environment has to be understood as a stream of several continuously captured images of the environment, which are displayed on the display device in form of a live video. So also the additional visual information provided by the first vehicle or its associated first device can be proved as a first video stream and be embedded in the second video stream image by image.

According to another advantageous embodiment of the invention, in the at least one image of the environment an area, which represents the first vehicle, is determined and the visual information is displayed at the determined area in the at least one image, especially as an overlay. In other words, the visual information is displayed on the back of the first vehicle in the at least one image. This advantageously creates a realistic impression of seeing through the first vehicle, as at least most parts of this displayed first vehicle are covered by the displayed received visual information, at least as long as no object is detected in the certain part of the environment.

Thereby the visual information can be displayed in completely unmodified manner or also a gradient mask can be applied to at least one image of the received first video stream, and the at least one image of the received first video stream can then be displayed embedded in the second video stream according to the applied gradient mask. The gradient mask can for example define a degree of transparency of the respective images of the first video stream, whereby the transparency is increasing from the centre to the edges of the respective images. Moreover, it is also possible to display or stream only part of the field of view captured by the first device, like to stream only video data relating to a certain central area of the field of view of the camera of the first device. This has the advantage, that the most relevant see-through information can be provided to the user of the second vehicle and at the same time the data traffic can be reduced. Also more sophisticated modifications are possible, like displaying only parts of the visual information, which relate to that part of the environment, which is concealed by the first vehicle traveling ahead. However, such more complicated modifications of the visual information are less preferred, as there are computational expensive and therefore are harder to be executed by a mobile communication device in real time.

Moreover, according to another very advantages embodiment of the invention the displaying of the visual information is only modified in case the at least one object is detected at a position between the first vehicle and the second vehicle. First of all, an object, which is positioned between the first vehicle and the second vehicle lies in the direct way of the second vehicle and therefore is especially in critical with regard to a possible collision. Furthermore, as described above, the visual information preferably is embedded in the first video stream at a position that represents the first vehicle. At such a displaying position the risk of occluding some object between the first vehicle and the second vehicle is particularly high. On the other hand, there is no risk of a possible collision for objects outside this region between the first vehicle and the second vehicle and moreover, objects within the images of the second video stream at such a position outside this region between the first and the second vehicle can also not be occluded by the displaying of the visual information embedded in the images of the second video stream. Therefore it is very advantages, to modify the displaying of the visual information in case, especially only in case the at least one object is detected at a position between the first and the second vehicle.

Furthermore, for detecting the at least one object in the certain part of the environment, also the second mobile communication device can be used. Especially, the at least one sensor device, which is used for detecting the first vehicle, can at the same time be used for detecting objects, especially in front of the second vehicle. The second mobile communication device can optionally furthermore be configured to classify detected objects as described above. Again, using the second mobile communication device for detecting and/or classifying objects has the advantage, that also the object detection and/or classification can be implemented completely independent of any vehicle component. Therefore, according to another advantages embodiment of the invention, the at least one object is detected on the basis of an analysis of the at least one image of the certain part of the environment, especially by means of the second mobile communication device.

On the other hand, also vehicle components can be used for the detection and/or classification of objects. Therefore, according to another advantages embodiment of the invention, the at least one object is detected by means of at least one sensor of the second vehicle the second mobile communication device is associated with and an information of the detection of the at least one object is communicated from the second vehicle to the second mobile communication device. A variety of driver assistance systems are known from the prior art, which use vehicle sensors to do detect objects in the environment of the vehicle and which also allow for a very accurate and reliable object classification. Such well-established object detection and/or classification methods implemented by vehicle components therefore allow for a very accurate and reliable object detection and classification. So it's very advantageous to use e.g. vehicle sensors and algorithms to detect and/or classify the at least one object in the certain part of the environment, as such the at least one object can be detected and classified with very high reliability.

For example, the second device associated with the second vehicle can then determine that the at least one object different from the first vehicle is present in the certain part of the environment based on a signal received from the second vehicle, wherein after receiving the signal the second device modifies the displaying of the visual information correspondingly. The information about the detected at least one object can for example be directly derived from the CAN bus of the second vehicle and be communicated to the second device.

Moreover, according to another advantages embodiment of the invention the at least one object is detected by means of at least one sensor of the first vehicle, and an information of the detection of the at least one object is communicated from the first vehicle to the second vehicle and/or to the second mobile communication device, especially via a central data processing unit. So advantageously, to detect objects, especially between the first and second vehicle also sensors of the first vehicle can be used. In case, an object is detected by means of the first vehicle, the information can be provided to the second mobile communication device in different ways. For example direct vehicle-to-vehicle communication can be used to transmit the information about that detection of the at least one object from the first vehicle to the second vehicle directly and then the information can be passed by the second vehicle to the second mobile communication device. The information about the detection of the at least one object can also be transmitted from the first vehicle to the second vehicle indirectly, e.g. via a central data processing unit. For example the first vehicle can transmit this information about the detected at least one object to such a central data processing unit, which then transmits this information to the second vehicle or directly to the second mobile communication device. On the other hand, the information about the detection of the at least one object can also be transmitted from the first vehicle to the first device and then from the first device to the central data processing unit and from the central data processing unit to the second mobile communication device. Therefore, there are many advantageous ways to provide the information about the detection of at least one object, which is positioned between the first and the second vehicle, from the first vehicle to the second mobile communication device.

Moreover, for detecting objects by means of the first vehicle, sensors can be used, which are capable of capturing an area behind the first vehicle, like a rear camera or other sensors. Generally, for detecting objects in the environment a variety of different vehicle sensors can be used. For example, the at least one object can be detected by means of at least one camera and/or by means of at least one radar sensor and/or by means of at least one LIDAR sensor and/or by means of at least one ultrasonic sensor or any arbitrary number and/or combination of those sensors. Additionally, for detecting objects between the first and second vehicle also both, sensors of the first vehicle as well as sensors on the second vehicle can be used. In addition also an object detection can be performed by the second mobile communication device. Thereby, safety can be enhanced even more and objects between the first and second vehicle can be detected with particularly high reliability.

Furthermore, not only the information about the detection of an object can be transmitted to the second mobile communication device via the central data processing unit, but also the visual information. Therefore, according to another advantageous embodiment of the invention, the visual information is transmitted from the first device to a central data processing unit, especially a cloud server, and is transmitted from the central data processing unit to the second mobile communication device. Therefore, vehicles or especially the mobile communication devices associated with the respective vehicles, can simply register with a web service, for example by using their respective licence plate numbers as identifiers, which is explained later, and by registering with such a web service the respective mobile communication devices can signalize that they are capable of sharing and willing to share visual information capturable by their respective mobile communication devices. So advantageously, the availability and distribution of the visual information can be performed centralized by the central data processing unit. A further great advantage of this embodiment is, that no direct communication between vehicles or the mobile communication devices is required. So in case the driver wants to use see-through functionalities, such a driver or user does not need to purchase a car with a compatible system. Most users have a smartphone anyway and the see-through functions can be implemented completely car independent, which makes it possible to retrofit older cars with see-through functionalities and no costs. Also the object detection can be performed by the second mobile communication device as already mentioned. Nevertheless, direct communication between the first and second vehicle can still be implemented, e.g. to transmit the information about the detected object as described above, and also vehicle sensors can be used for the object detection to provide higher reliability.

Moreover, according to another advantageous embodiment of the invention, in case the at least one object is detected by means of the first vehicle, then the information about the detected object preferably is transmitted to the second mobile communication device and/or to the central data processing unit only in case the visual information is currently provided to the central data processing unit. In other words, only in case the first video is currently streamed to the central data processing unit and from the central data processing unit to any other mobile communication device, which has requested the visual information, also the information about the detected object is transmitted and otherwise not. Advantageously, thus unnecessary data transmission can be avoided.

According to another advantageous embodiment of the invention, as also mentioned above, after detecting the first vehicle, a license plate of the first vehicle can be detected and an identifier of the first vehicle is derived from the detected license plate, for example the license plate number or at least part thereof, wherein the visual information is requested using the derived identifier of the first vehicle to identify the first vehicle, which conceals the view onto the at least part of the environment, the visual information about which is requested.

So advantageously, the license plate of the first vehicle can be used as identifier to identify the first vehicle. For detecting the license plate the at least one sensor device, especially the camera, of the second mobile communication device can be used. To derive the identifier from the license plate, namely the license plate number or part thereof, for example optical character recognition can be used or similar image content analysis methods. So, when a vehicle, in this case the first vehicle, is detected as well as its license plate, the visual information relating to this first vehicle can be requested in an easy way by using the identifier of the first vehicle derived from its license plate. Consequently, no position information has to be determined and exchanged to request a correct visual information relating to the vehicle, which is currently blocking the view. As detecting and recognizing a license plate as well as a license plate number thereon can be performed in a very cost effective and still accurate way, the invention and its embodiments allow for proving see-through functionalities in a very cost effective an accurate way as well.

The invention also relates to a computer program product, especially an application program or so called app for a mobile communication device like a smartphone. The computer program product comprises program code, which is stored in a computer readable medium, and which when executed by a processor of an electronic control device causes the processor to detect a first vehicle travelling ahead and concealing a view onto at least part of an environment, to request a visual information about the at least part of the environment, the view onto which is at least in part concealed by the first vehicle, and in case of an availability of the requested visual information to receive the visual information and to display at least one captured image of a certain part of the environment including at least part of the first vehicle and to display the received visual information embedded in the at least one image on a display device. Furthermore, the program code when executed by the processor causes the processor in case it is determined that at least one object different from the first vehicle is present in the certain part of the environment to modify the displaying of the visual information such that image parts representing the at least one object are not covered by the visual information.

The invention also relates to a mobile communication device for providing visual information about at least part of an environment, the view onto which is at least in part concealed by a first vehicle travelling ahead, wherein the mobile communication device comprises at least one sensor device, especially a camera, which is configured to detect the first vehicle, wherein the mobile communication device comprises a communication unit, which is configured to request the visual information about the at least part of the environment, the view onto which is at least in part concealed by the first vehicle. Moreover, the communication unit is configured to receive the visual information in case of an availability of the requested visual information, wherein the mobile communication device comprises a display device, which is configured to display at least one captured image of a certain part of the environment including at least part of the first vehicle and the received visual information embedded in the at least one image. Further, the mobile communication device is configured in case it is determined, that at least one object different from the first vehicle is present in the certain part of the environment to modify the displaying of the visual information such that image parts representing the at least one object are not covered by the visual information.

The invention also relates to a communication system comprising at least one mobile communication device according to the invention or its embodiments and a central data processing unit, wherein the central data processing unit is configured to transmit upon request the visual information to the at least one mobile communication device, wherein the at least one mobile communication device is configured to determine that at least one object different from the first vehicle is present in the certain part of the environment based on an information received from the central data processing unit.

Especially, the mobile communication device according to the invention or its embodiments can be configured as described before with regard to the first device and/or the second mobile communication device.

The advantages described with regard to the method according to the invention and its embodiments similarly apply for the computer program product, the mobile communication device and the communication system according to the invention. Moreover, the embodiments described with regard to the method according to the invention constitute further advantageous corresponding embodiments of the computer program product, the mobile communication device and the communication system according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Figure 2:
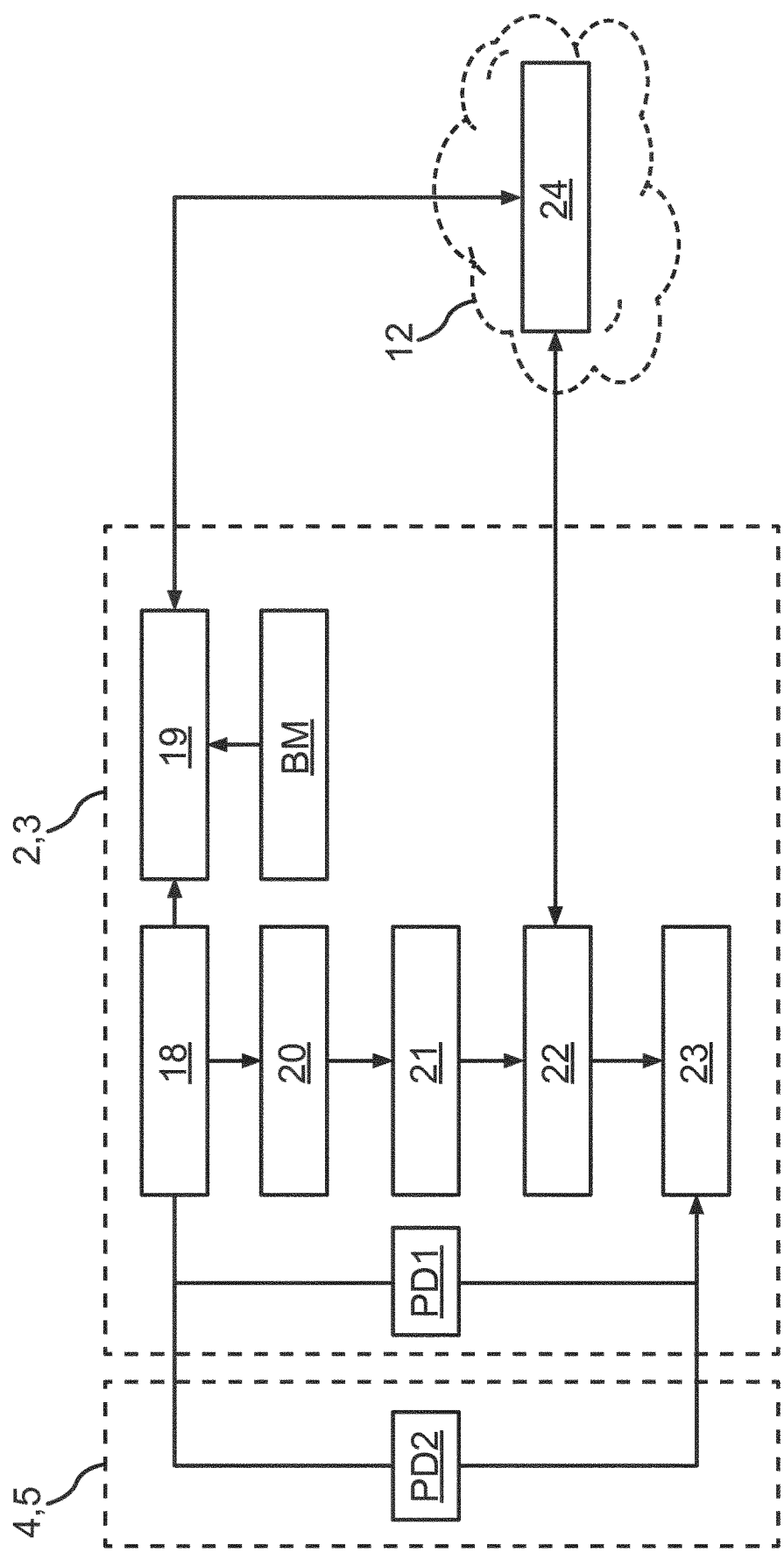
Figure 3:
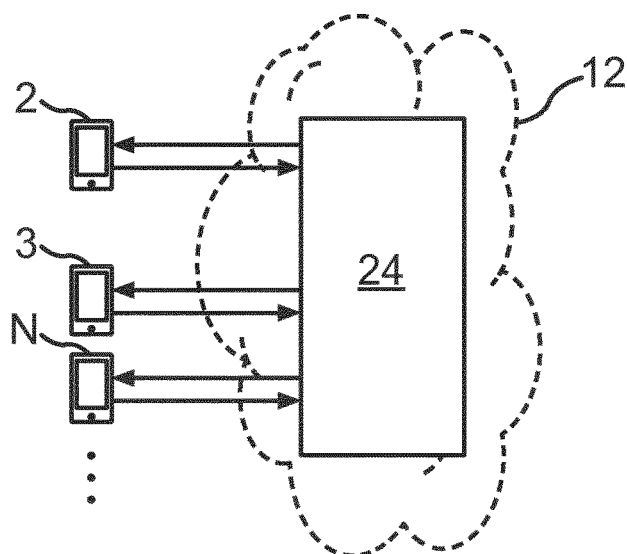
Figure 4:
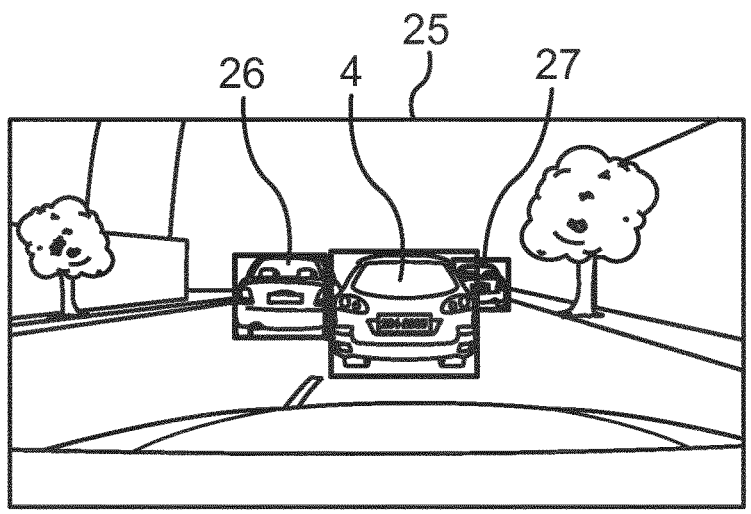
Figure 5:
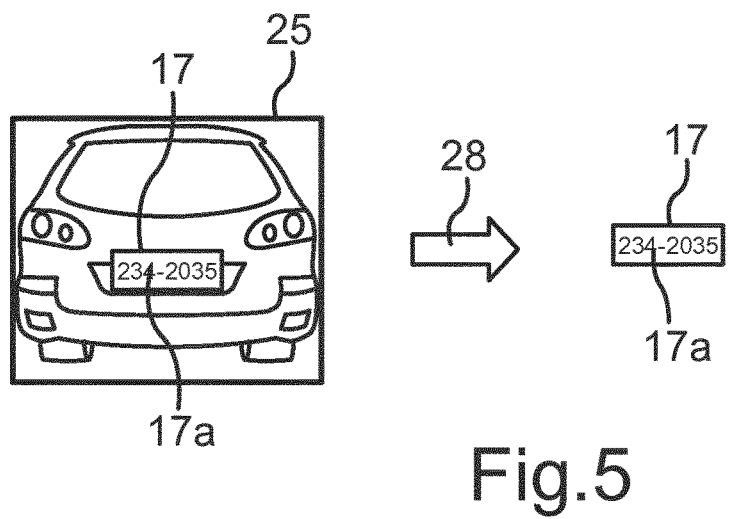

Therein show:

FIG. 1 a schematic illustration of a communication system with two mobile communication devices, each associated with a corresponding vehicle for providing visual information about at least part of an environment, a view onto which is at least in part concealed by one of the vehicles, according to an embodiment of the invention;

FIG. 2 a schematic illustration of a functional diagram for illustrating a method for providing visual information according to an embodiment of the invention;

FIG. 3 a schematic illustration of the functional performed by a cloud server of a communication system according to an embodiment of the invention;

FIG. 4 a schematic illustration of the detection of a vehicle traveling ahead on the basis of the captured image as performed by a mobile communication device according to an embodiment of the invention;

FIG. 5 a schematic illustration of a extraction of a license plate number as identifier on the basis of the image captured by a mobile communication device according to an embodiment of the invention;

FIG. 6 a schematic illustration of the embedding of the visual information provided by the vehicle traveling ahead into an image of a video stream provided by the mobile communication device of the trailing vehicle; and FIG. 7 a schematic illustration of the detection of an object between the first and second vehicle and the modification of the displaying of the visual information according to an embodiment of the invention.

FIG. 1 shows a schematic illustration of a communication system 1 comprising in this example two mobile communication devices, namely a first mobile communication device 2 and a second mobile communication device 3, each associated with a respective vehicle, namely a first vehicle 4 and a second vehicle 5, wherein the first vehicle 4 is travelling ahead of the second vehicle 5. Each of the mobile communication devices 2, 3 comprises a processing unit 6, 7, at least one sensor device, which is configured as a camera 8, 9 and a communication unit 10, 11. The communication units 10, 11 are capable of communicating with a central data processing unit, which in this example is a cloud server 12. This communication is illustrated by the arrows 13.

Also each of the mobile communication devices 2, 3 comprises a display device 14, 15. Preferably, the mobile communication devices 2, 3, which are preferably configured as smartphones but can also be configured as a tablet PC, a laptop, a notebook, and so on, are positioned behind the windshield of the associated vehicles 4, 5, such that the respective fields of view FOV1, FOV2 of the cameras 8, 9 of the respective mobile communication devices 2, 3 cover at least part 16*a*, 16*b* of the environment 16 in the front of the respective vehicles 4, 5.

In this example, the view of the camera 8 of the second mobile communication device 3 onto at least part of the environment 16 is concealed by the first vehicle 4 travelling ahead. The invention and its embodiments now allow for a very advantageous see through functionality, which advantageously can be independent of any component of the corresponding vehicles 4, 5. To perform this see through function an application running on the processing unit 6, 7 of the first and second mobile communication devices 2, 3 can cause the corresponding processing units 6, 7 to execute a method as described in the following. Thereby functions performed by the first mobile communication device 2 can similarly be performed by the second mobile communication device 3 as well and the other way round.

First of all, the camera 8 of the second mobile communication device 3 continuously captures images of the part 16b of the environment 16 within its field of view FOV2. The captured images can be analyzed and based on such an analysis vehicles like the second vehicle 4 can be detected within those captured images. To detect vehicles known object detection and classification methods can be used. Especially known learning algorithms and methods like AdaBoost, support vector machine or deep learning can be used. In case several vehicles are detected, then the most central on the captured images is selected, in this case the first vehicle 4, for which the visual see through information shall be requested. So as soon as the first vehicle 4 is selected, the license plate is detected on the basis of the captured images as well as and the license plate number is extracted from the detected license plate 17. Also here above-named algorithms and methods can be used to recognize and read the license plate number. After that, the second mobile communication device 3 sends a request by means of its communication unit 10 to the cloud server 12 for requesting the visual information, which is concealed by the first vehicle 4. Together with the request also the derived license plate number is transmitted to the cloud server 12 as identifier of the first vehicle 4. After that, the cloud server 12 checks, whether the requested visual information related to the first vehicle 4 is available. This is the case if the first mobile communication device 2 has registered with the cloud server 12 providing its license plate number as identifier and signalizing that an environmental video stream is available. So if this is the case, the cloud server 12 informs the second mobile communication device 3, that the requested visual information is available and communicates to the first mobile communication device 2 that the visual information has been requested. After that, images captured by the camera 9 of the first mobile communication device 2 are streamed in form an environmental live video via the cloud server 12 to the second mobile communication device 3. At the same time, the second mobile communication device 3 keeps on capturing images by means of its camera 8 of the part 16b of the environment 16 and provides these images in form of a second video stream. The received visual information in form of the first video stream provided by the first mobile communication device 2 is now embedded into this second video stream image by image by means of the second mobile communication device 3 and displayed on the display device 14.

Such see-through functionalities in most cases enhance safety, as they provide additional environmental information to the user. However, normal see-through functions can hide objects O, like in this example a pedestrian, within a certain area A between the vehicles. This can now advantageously be avoided by means of the invention and its embodiments. In case the at least one object O different from the first vehicle 4 is present in this certain area A between both vehicles 4; 5, the displaying of the visual information is modified, especially interrupted. Thereby, image parts representing the at least one object O cannot be covered by the visual information.

The detection of such an object O like a pedestrian or other road user can for example be performed by in the second mobile communication device 3. For this purpose, the images captured by the camera 8 can additionally be analyzed with regard to whether certain objects are present within that certain area A, e.g. within a certain center region of the field of view FOV2 of the camera 8. Optionally, detected objects O can also be classified. For example, the displaying of the visual information can only be modified in case a certain object, like persons, pedestrians, other vehicles, bicycles, motorcycles, buggies, or maybe also animals, and so on, are detected, but not in case non-living objects, which can be driven over without danger, like a plastic bag, are detected.

Additionally or alternatively also vehicle sensors can be used for the object detection. For this purpose, as illustrated in FIG. 1, the first vehicle 4 and/or the second vehicle 5 can comprise at least one environment sensor S, for example a camera, a laser scanner like a LIDAR sensor, a radar sensor, an ultrasonic sensor or also several of those sensors or any arbitrary combination thereof. Each of those environment sensors S can then be associated with a corresponding field of view FOV3 and FOV4, respectively. Moreover, each of the vehicles 4, 5 can comprise an electronic control unit ECU, which is configured to analyze the captured sensor data and to determine whether certain objects O are present within the certain area A. In case such a certain object O is detected by the electronic control unit ECU of the second vehicle 5, the information about the detection of this object O can directly be communicated to the second communication device 3, which for example can derive this information from the CAN bus B of this second vehicle 5. In case such a certain object O is detected by the first vehicle 4, then the information about the detection can be communicated in several ways to the second communication device 3. For example each of the vehicles 4, 5 may comprise a communication unit C, like a telematics unit, by means of which the vehicles 4, 5 can directly communicate with each other. This direct communication is illustrated in FIG. 1 by the arrow 32. This information can then again be communicated over the CAN bus B of the second vehicle 5 to the second mobile communication device 3. Alternatively, the information about the detection of the object O can also be communicated of over the Can bus B of the first vehicle 4 to the first mobile communication device 2, which transmits this information via the central data processing unit 12 to the second mobile communication device 3. Therefore, there are many advantageous ways for detecting objects O in the certain area A between the first and the second vehicle 4, 5. Upon detection of such an object O, the second mobile communication device 3 can then advantageously interrupt the displaying of the visual information. Therefore, it can be ensured, that the detected object O is not occluded by the displaying of the visual information.

The displaying of the visual information can additionally be modified also in other situations to enhance safety even more. For example critical situations may also occur, in case of such a see-through function hides for example the braking lights of the vehicle traveling ahead, which therefore can be dangerous as well. This also can be avoided advantageously by further embodiments of the invention. For this purpose, it can be determined, when the first vehicle 4 is braking and in case it is detected, that the first vehicle 4 is braking, the displaying of the visual information is modified, especially such that at least one braking light is visible in the displayed at least one image of the environment 16. Such a modification can be implemented either by completely omitting the displaying of the additional visual information, or by increasing the transparency of the displayed visual information and/or on by highlighting the braking lights in the images of the captured second video stream.

To detect the braking of the first vehicle 4, the braking information on the CAN bus B of the first vehicle 4 can be communicated to the first mobile communication device 2 and then be transmitted via the cloud server 12 to the second mobile communication device 3, which then correspondingly modifies upon receipt of the braking information the displaying of the visual information. As long as the first vehicle 4 is braking, also the braking information is transmitted via the cloud server 12 to the second mobile communication device 3. In case the first vehicle 4 terminates braking, the second mobile communication device 3 does not receive any braking information anymore and then starts displaying the visual information again embedded in the second video stream. For detecting the braking of the first vehicle 4 the first mobile communication device 2 may also comprise an acceleration sensor, also called G-sensor G. In case the first vehicle 4 is braking, this can advantageously be detected by this G-sensor G and the braking information can be transmitted and processed by the second mobile communication device 3.

Further details of advantages embodiment of the invention are described now with regard to FIG. 2 to FIG. 7. FIG. 2 shows a schematic illustration of a functional diagram for providing visual information according to an embodiment of the invention. The functional components of the mobile communication devices 2, 3 are the built in camera video stream module 18, a first communication module 19, which performs the function of a cloud video manager, a vehicle detection and selection module 20, a license plate reader 21, a second communication module 22, which performs the function of the video stream receiver, and a video composer and rendering module 23. On the other hand the cloud server 12 comprises a cloud video dispatcher module 24. Moreover, the mobile communication devices 2, 3 comprise a pedestrian detection module PD1 for detecting objects or obstacles in the certain area A of the environment. Also all the first and/or second vehicle 4, 5 may comprise such a pedestrian detection module PD2. Further, the mobile communication devices 2, 3 comprise a braking information module BM, which can also be called car dynamic information module, as it is capable of providing information relating to the driving dynamics of the vehicle to determine whether the vehicle the mobile communication device 2, 3, is associated with is braking. The performed functions of the respective modules are now explained in more detail with regard to FIG. 3 to FIG. 7.

FIG. 3 shows a schematic illustration of the cloud video dispatcher module 24. The cloud server 12 as already explained, can communicate with the first and second mobile communication devices 2, 3 as well as with any arbitrary number of further mobile communication devices N. All such mobile communication devices 2, 3, N are communicating their availability to the cloud video dispatcher module 24 with the license plate as identifier as described before. Moreover, also all mobile communication devices 2, 3, N can retrieve a video stream for specific vehicles, which are identified based on their license plate number. So on the one hand all mobile communication devices 2, 3, N, which want to share their captured video stream with other vehicles to provide see through functions can signalize their availability to the cloud video dispatcher module 24 together with their respective license plate numbers, and on the other hand all mobile communication devices 2, 3, N, which want to provide the see through function, can request visual information from the cloud video dispatcher 24 for specific vehicles, which are identified based on their license plate numbers.

Moreover, also all the mobile communication devices 2, 3, N can transmit the braking information to the cloud video dispatcher module 24 in case they detect a braking of the vehicle, they are associated with. However, such braking information is only transmitted to the cloud video dispatcher module 24 in case that the respective mobile communication device 2, 3, N is currently streaming its captured video to the cloud video dispatcher module 24. In case the cloud video dispatcher module 24 receives such braking information, it transmits the information to the mobile communication devices 2, 3, N which are currently streaming the first video of the vehicle in question, namely the vehicle which is currently braking.

Now first the detection and selection of the vehicle travelling ahead is described in the following with regard to FIG. 4. FIG. 4 shows a schematic illustration of an image, which is captured by the camera 8 of the second mobile communication device 3, especially as part of a second video stream. At the same time this captured second video stream can be displayed on the display device 14 of the second mobile communication device 3. So this second video stream is provided by the built in camera video stream module 18. Based on the captured images of this second video stream the vehicle detection and selection module 20 vehicles are detected and one of them is selected. In this example, in the image 25 three vehicles 4, 26, 27 have been detected, wherein only the most central one, in this case the first vehicle 4, is selected by the vehicle detection and selection module 20.

After that, as illustrated in FIG. 5, the license plate reader 21, which can be also some kind of suitable algorithm or image analysis method, identifies the license plate 17 and reads the license plate number 17a. The extraction of the license plate number 17a out of the image 25 is illustrated by the arrow 28. Based on the identified license plate number 17a the first communication module 19, namely the cloud video manager requests from the cloud server 12 the visual information, which is blocked at least in part by this first vehicle 4 travelling ahead, whereby the communication module 19 also transmits the identified license plate number 17a to identify the first vehicle 4, with regard to which the visual information is requested. In case the requested visual information is available, the cloud video dispatcher module 24 of the cloud server 12 transmits the first video stream provided by the first mobile communication device 2 to the second communication module 22, which is a video stream receiver. The received first video stream is then passed image by image to the video composition and rendering module 23, which composes the first video stream provided by the built in camera video stream module 18 and the received first video stream. This is illustrated in FIG. 6.

FIG. 6 shows on the right hand side an image 25a provided by the built in camera video stream module 18 captured by the camera 8 of the second mobile communication device 3 and the received visual information in form of an image 29 of the streamed first video provided by the camera 9 of the first mobile communication device 2 and on the left hand side the composed image 31. To provide this composed image 31 the video composition and rendering module 23 first determines a certain area in the image 25a captured by the second mobile communication device 3 as part of the second video stream, which in the following is therefore called second image 25a. This area 30 constitutes the part of the second image 25a, which represents the first vehicle 4. The first image 29, namely the image of the received first video stream is then overlaid over the second image 25a within the defined area 30. Moreover, also a gradient mask can be applied to the remote video stream, namely to the first image 29, especially each first image 29 of the first video stream, to provide smooth transitions from the first image 29 to the surrounding parts of the second image 25$a$. The finally composed image 31 is then displayed on the display device 14 of the second mobile communication device 3. This is especially performed in each time step namely from each image of the received first video stream and the corresponding images of the captured second video stream.

FIG. 7 shows a schematic illustration of the detection of the certain object O as performed by the pedestrian detection module PD1, PD2 and the modification of the displaying of the visual information 29 as performed by the second mobile communication device 3 according to an embodiment of the invention. Also the detection of the certain object O, in this example a pedestrian, can be performed based on learning algorithms like AdaBoost, support vector machines or deep learning, as described with regard to the detection and selection of the first vehicle. Such detection can be performed based on the images 25$a$ of the second video stream by means of the second mobile communication device 3, as in this example illustrated here in FIG. 7, or alternatively or additionally also based on images or other sensor data captured by means of vehicle sensors S, either those of the second vehicle 5 and/or those of the first vehicle 4. The detection of the pedestrian as an example of a certain object O is illustrated in FIG. 7 in the image on top. As the displayed visual information 29 might occlude objects O or at least part thereof, which are between the first and the second vehicle 4, 5, as can be seen in FIG. 7 in the image on the left, the displaying of the visual information 29 is interrupted in case such an object O is detected. As a result, only in the images 25$a$ of the second video stream are displayed and not the additional visual information 29, so that advantageously the detected object O cannot be covered by the visual information and is clearly visible for the driver, as is illustrated in FIG. 7 in the image on the right hand side.

So advantageously the second video stream can be processed to detect obstacles to adapt the human machine interface, namely the display on the display device, to keep the view safe and reliable. Additionally or alternatively, not only in the second video stream can be used to detect obstacles or objects O, but also e.g. scalar data provided by a laser scanner of the first vehicle 4 and/or the second vehicle 5, or other sensor data sensor data provided by any other vehicle sensor type.

Therefore the invention and its embodiments allow for a very advantageous see-through function with additionally enhanced safety functionalities.

The invention claimed is:

1. A method for providing visual information about at least part of an environment on a display device, the method comprising:
    detecting a first vehicle travelling ahead by at least one sensor device;
    requesting the visual information about the at least part of the environment, a view onto which is at least in part concealed by the first vehicle, from a communication unit;
    in case of an availability of the requested visual information, receiving the visual information from the communication unit;
    capturing at least one image of a certain part of the environment including at least part of the first vehicle;
    displaying the at least one image of the certain part of the environment and the received visual information embedded in the at least one image on the display device;
    wherein, when it is determined that at least one object different from the first vehicle is present in the certain part of the environment and it is further determined that the at least one object cannot be safely driven over, the displaying of the visual information is modified so that the at least one object is clearly visible for a driver,
    wherein, when it is determined that the at least one object can be safely driven over, the at least one image is displayed with the visual information embedded therein such that the at least one object is covered by the visual information,
    wherein the visual information is provided in form of at least part of a first video stream captured by a first device which is associated with the first vehicle, comprising a first mobile communication device within the first vehicle,
    wherein the at least one sensor device, the communication unit, and the display device are provided as part of a second mobile communication device comprising a smartphone or tablet associated with a second vehicle trailing the first vehicle, and
    wherein the visual information is transmitted from the first device to a central data processing unit via a cloud server, and is transmitted from the central data processing unit to the second mobile communication device via the cloud server, and
    capturing, with the first vehicle, sensor data corresponding to the certain part of the environment that contains the at least one object, and
    wherein the at least one object is disposed between the first vehicle and the second vehicle.

2. The method according to claim 1, wherein, when it is determined that the at least one object different from the first vehicle is present in the certain part of the environment, the displaying of the visual information is modified by interrupting the displaying of the received visual information.

3. The method according to claim 1, wherein the displaying of the visual information is only modified at least under a condition that the at least one object is classified as being associated with a person.

4. The method according to claim 1, wherein the displaying of the visual information is only modified when the at least one object is detected at a position between the first vehicle and the second vehicle.

5. The method according to claim 1, wherein the at least one image of the environment including at least part of the first vehicle is provided in a form of a second video stream by the at least one sensor device.

6. The method according to claim 1, wherein in the at least one image an area representing the first vehicle is determined and the visual information is displayed at the determined area in the at least one image.

7. The method according to claim 1, wherein the at least one object is detected on a basis of an analysis of the at least one image of the certain part of the environment, by the second mobile communication device.

8. The method according to claim 1, wherein the at least one object is detected by at least one sensor of the second vehicle, with which the second mobile communication device is associated, and an information of the detection of the at least one object is communicated from the second vehicle to the second mobile communication device.

9. The method according to claim 1, wherein the at least one object is detected by at least one sensor of the first vehicle, and an information of the detection of the at least one object is communicated from the first vehicle to the second vehicle and/or to the second mobile communication device via a central data processing unit.

10. A computer program product comprising program code stored in a non-transitory computer readable medium, and which when executed by a processor of an electronic control device causes the processor to:
- detect a first vehicle travelling ahead;
- wherein the first vehicle conceals a view onto at least part of an environment;
- request a visual information about the at least part of the environment, the view onto which is at least in part concealed by the first vehicle;
- in case of an availability of the requested visual information receive the visual information;
- display at least one captured image of a certain part of the environment including at least part of the first vehicle and display the received visual information embedded in the at least one image on a display device;
- wherein, when it is determined that at least one object different from the first vehicle is present in the certain part of the environment and it is further determined that the at least one object cannot be safely driven over, modify the displaying of the visual information so that the at least one object is clearly visible for a driver,
- wherein, when it is determined that the at least one object can be safely driven over, the at least one image is displayed with the visual information embedded therein such that the at least one object is covered by the visual information,
- wherein the visual information is provided in form of at least part of a first video stream captured by a first device which is associated with the first vehicle, comprising a first mobile communication device within the first vehicle,
- wherein at least one sensor device, a communication unit, and the display device are provided as part of a second mobile communication device comprising a smartphone or tablet associated with a second vehicle trailing the first vehicle,
- wherein the visual information is transmitted from the first device to a central data processing unit via a cloud server, and is transmitted from the central data processing unit to the second mobile communication device via the cloud server, and
- receiving, from the first vehicle, sensor data corresponding to the certain part of the environment that contains the at least one object, and
- wherein the at least one object is disposed between the first vehicle and the second vehicle.

11. A mobile communication device for providing visual information about at least part of an environment, a view onto which is at least in part concealed by a first vehicle travelling ahead, the mobile communication device comprising:
- at least one sensor device, which is configured to detect the first vehicle;
- a communication unit configured to request the visual information about the at least part of the environment, the view onto which is at least in part concealed by the first vehicle,
- wherein the communication unit is also configured to receive the visual information in case of an availability of the requested visual information;
- a display device configured to display at least one captured image of a certain part of the environment including at least part of the first vehicle and the received visual information embedded in the at least one image;
- wherein the mobile communication device is configured, when it is determined that at least one object different from the first vehicle is present in the certain part of the environment and it is further determined that the at least one object cannot be safely driven over, to modify the displaying of the visual information so that the at least one object is clearly visible for a driver,
- wherein the mobile communication device is configured, when it is determined that the at least one object can be safely driven over, to display the at least one image with the visual information embedded therein such that the at least one object is covered by the visual information,
- wherein the visual information is provided in form of at least part of a first video stream captured by a first communication device which is associated with the first vehicle,
- wherein the mobile communication device comprises a smartphone or a tablet and is associated with a second vehicle trailing the first vehicle, and
- wherein the visual information is transmitted from the first communication device to a central data processing unit via a cloud server, and is transmitted from the central data processing unit to the mobile communication device via the cloud server, and
- receiving, from the first vehicle, sensor data corresponding to the certain part of the environment that contains the at least one object, and
- wherein the at least one object is disposed between the first vehicle and the second vehicle.

12. A communication system comprising:
- at least one mobile communication device according to claim 11; and
- a central data processing unit, wherein the central data processing unit is configured to transmit upon request the visual information to the at least one mobile communication device,
- wherein the at least one mobile communication device is configured to determine that at least one object different from the first vehicle is present in the certain part of the environment based on an information received from the central data processing unit.

* * * * *